(12) United States Patent
Sudou et al.

(10) Patent No.: US 10,859,418 B2
(45) Date of Patent: *Dec. 8, 2020

(54) AIRFLOW MEASURING DEVICE

(71) Applicant: DENSO CORPORATION, Kariya (JP)

(72) Inventors: Akiyuki Sudou, Kariya (JP); Kengo Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 146 days.

This patent is subject to a terminal disclaimer.

(21) Appl. No.: 15/132,322

(22) Filed: Apr. 19, 2016

(65) Prior Publication Data

US 2016/0313165 A1 Oct. 27, 2016

(30) Foreign Application Priority Data

Apr. 21, 2015 (JP) .................................. 2015-86906

(51) Int. Cl.
*G01F 5/00* (2006.01)
*G01F 1/684* (2006.01)

(52) U.S. Cl.
CPC .............. *G01F 5/00* (2013.01); *G01F 1/6842* (2013.01)

(58) Field of Classification Search
CPC ................................ G01F 5/00; G01F 1/6842
USPC ...................................................... 73/114.32
See application file for complete search history.

(56) References Cited

U.S. PATENT DOCUMENTS 5,804,718 A * 9/1998 Nagasaka ............. G01F 1/6842
73/114.34

| | | | |
|---|---|---|---|
| 10,168,195 B2 * | 1/2019 | Morino | G01F 1/6842 |
| 10,422,676 B2 * | 9/2019 | Sudou | G01F 1/692 |
| 2003/0046996 A1 * | 3/2003 | Nakada | G01F 1/684 73/202.5 |
| 2003/0089168 A1 * | 5/2003 | Lenzing | G01F 1/684 73/202.5 |
| 2003/0094041 A1 * | 5/2003 | Iwaki | G01F 1/6842 73/204.21 |
| 2003/0159501 A1 * | 8/2003 | Renninger | G01F 1/6842 73/114.33 |
| 2005/0241389 A1 * | 11/2005 | Kitahara | G01F 1/6842 73/204.23 |
| 2010/0242589 A1 * | 9/2010 | Morino | G01F 1/6842 73/202.5 |
| 2012/0240668 A1 * | 9/2012 | Goka | G01F 1/6842 73/114.32 |

(Continued)

FOREIGN PATENT DOCUMENTS

DE 102008042807 A1 4/2010

*Primary Examiner* — Marrit Eyassu

(57) ABSTRACT

A case is equipped to an intake passage where a mainstream of air flows toward an engine. The case has a bypass passage which draws a part of the mainstream. A sensor is equipped to the bypass passage. The case has an external wall as a side wall extending along the mainstream direction in which the mainstream flows. The bypass passage has an outlet port formed in the side wall as an opening which opens in a direction substantially perpendicular to the mainstream direction. The airflow measuring device further includes a throttle located on the upstream side in the mainstream direction than a center of the opening to throttle a stream of air which flows outside the case along the side wall. The throttle throttles the stream of air to flow toward a downstream side and to merge with air flowing out from the opening.

17 Claims, 8 Drawing Sheets

(56) References Cited

U.S. PATENT DOCUMENTS

| | | | |
|---|---|---|---|
| 2013/0014572 A1* | 1/2013 | Kitahara | G01F 1/6842 73/114.32 |
| 2013/0014573 A1* | 1/2013 | Kamiya | G01F 1/6842 73/114.32 |
| 2013/0019675 A1* | 1/2013 | Ban | G01F 5/00 73/202 |
| 2013/0055799 A1* | 3/2013 | Tsujii | G01F 1/6842 73/114.32 |
| 2013/0055800 A1* | 3/2013 | Kitahara | G01M 15/04 73/114.32 |

* cited by examiner

//<sub>US 10,859,418 B2</sub>//

AIRFLOW MEASURING DEVICE

CROSS REFERENCE TO RELATED APPLICATION

This application is based on reference Japanese Patent Application No. 2015-86906 filed on Apr. 21, 2015, the disclosure of which is incorporated herein by reference.

TECHNICAL FIELD

The present disclosure relates to an airflow measuring device.

BACKGROUND

An airflow measuring device may be equipped to an air intake passage where a mainstream of air flows to be drawn into an engine. The airflow measuring device may be configured to form a bypass passage which draws a part of the mainstream and to measure an airflow amount of the air with an airflow sensor which is equipped to the bypass passage.

For example, Patent Document 1 discloses an airflow measuring device which may include a case and an airflow sensor. The case may form a bypass passage which draws a part of a mainstream of air. The airflow sensor may be equipped to the bypass passage. An outlet port of the bypass passage may be formed in an external wall of the case which is along a mainstream direction. The airflow measuring device may form an opening which opens in a direction substantially perpendicular to the mainstream direction.

However, in such a structure of the outlet port, when the stream from the outlet port merges with the mainstream, peeling may occur. As a result, a vortex may happen on the downstream side of the outlet port relative to the mainstream. In view of the structure, peeling may be desirably reduced when the stream from the outlet port merges with the mainstream.

The airflow measuring device of Patent Document 1 may include a guide wall or a guide board to inhibit spreading of the peeling which occurs on the downstream side of the outlet port relative to the mainstream. The guide wall or the guide board is able to inhibit the spreading of the peeling which has occurred but unable to avoid the peeling itself.

(Patent Document 1)
Publication of unexamined German patent application No. 102008042807

SUMMARY

It is an object of the present disclosure to produce an airflow measuring device having a configuration to reduce peeling of a stream when a stream from an outlet port of a bypass passage merges with a mainstream.

According to an aspect of the present disclosure, an airflow measuring device includes a case and a sensor. The case is equipped to an intake passage where a mainstream of air flows toward an engine. The case further has a bypass passage which draws a part of the mainstream. The sensor is equipped to the bypass passage. The case has an external wall as a side wall extending along the mainstream direction in which the mainstream flows. The bypass passage has an outlet port formed in the side wall as an opening which opens in a direction substantially perpendicular to the mainstream direction. The airflow measuring device further includes a throttle located on the upstream side in the mainstream direction than a center of the opening to throttle a stream of air which flows outside the case along the side wall. The throttle throttles the stream of air to flow toward a downstream side and to merge with air flowing out from the opening.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
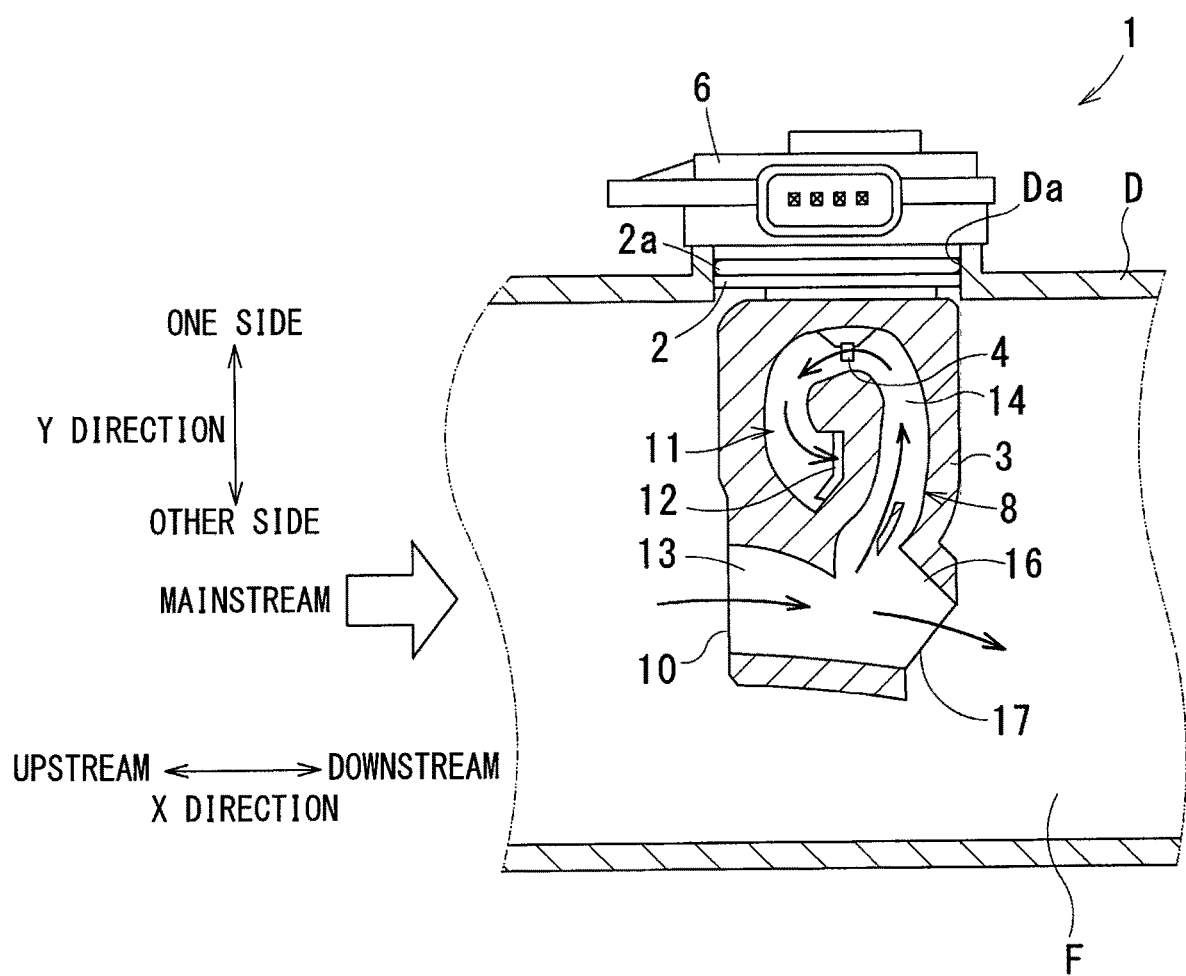
FIG. 1 is a sectional view showing an airflow measuring device according to the first embodiment.

As follows, embodiments of the present disclosure will be described in detail.

EMBODIMENT

First Embodiment (Configuration of First Embodiment)
Configuration of an airflow measuring device 1 according to the first embodiment will be described with reference to FIGS. 1 to 5. The airflow measuring device 1 is, for example, an airflow meter measuring an airflow amount drawn into an engine for an automobile. The airflow measuring device 1 is attached to a duct D which forms an intake passage F directed to the engine. The duct D has a tube wall having a mount hole Da which is opening therein. The airflow measuring device 1 is inserted through the mount hole Da into the duct D thereby equipped to the duct D.

The airflow measuring device 1 is integrated with components such as a fitting portion 2, a case 3, and an airflow sensor 4.

The fitting portion 2 is fitted to the mount hole Da. The fitting portion 2 has an external peripheral surface which faces an inner peripheral surface of the mount hole Da. The external peripheral surface forms a peripheral groove thereon (refer to FIG. 2). The peripheral groove contains an O ring which seals between the inner peripheral surface of the mount hole Da and the external peripheral surface of the fitting portion 2 (refer to FIG. 1).

The case 3 protrudes from the fitting portion 2 into the duct D along a direction substantially perpendicular to the mainstream direction. A part of the duct D protrudes from the fitting portion 2 toward the outside of the duct D. The part of the duct D is installed with a connector 6. The mainstream flows in the X direction. The case 3 protrudes in the Y direction. The X direction and the Y direction are substantially perpendicular to the Z direction.

The case 3 protrudes from the tube wall of the duct D into the center of the mainstream and forms a bypass passage 8 to draw a part of the mainstream which flows inside the duct D. The bypass passage 8 includes an inlet port 10, an inner passage 11 and a pair of outlet ports 12. The inlet port 10 draws air which is a part of the mainstream flowing inside the duct D. The inner passage 11 allows air drawn from the inlet port 10 to flow therein. The outlet ports 12 have air, which is drawn, merged with the mainstream flowing inside the duct D.

The inner passage 11 includes an intake passage 13 and a circulating passage 14. The intake passage 13 connects the inlet port 10 to the downstream side in the mainstream direction. The circulating passage 14 circumvents air from the intake passage 13 to the outlet ports 12.

The intake passage 13 divides into two passages at the end thereof. One of the passages is connected to the circulating passage 14. The other of the passages is connected to a dust discharging passage 16. The dust discharging passage 16 is a passage to flow dust, which is contained in the air drawn from the inlet port 10, to pass straight therethrough. The air, flowing to the dust discharging passage 16 via the intake passage 13, flows substantially in parallel with the mainstream. The dust discharging passage 16 has a dust discharging port 17 at the end thereof relative to the mainstream.

The circulating passage 14 has a shape adapted to flow air from the intake passage 13 through the following route. Specifically, the circulating passage 14 flows air from a center of the duct D toward the one side in the Y direction. That is, the circulating passage 14 flows air outward in the radial direction of the duct D toward the fitting portion 2. Subsequently, the circulating passage 14 flows air toward the upstream side relative to the mainstream direction. That is, the circulating passage 14 flows air in the opposite direction of the mainstream direction in the intake passage 13. Subsequently, the circulating passage 14 flows air toward the outlet ports 12 while directing the air toward the downstream side relative to the mainstream direction.

The outlet ports 12 include a pair of openings 12 which open in external walls 3a of the case 3. The external walls 3a of the case 3 are along the mainstream. The case 3 according to the first embodiment has a substantially rectangular shape when viewed in the Y direction. The external walls 3a include a pair of side walls 3b which are positioned along the mainstream direction (refer to FIG. 4). The shape of the case 3 when viewed in the Y direction is not limited to the rectangular shape and may be in an alternative shape, such as a polygonal shape or a streamline shape.

According to the first embodiment, the cross section of the case 3 has the rectangular shape so that the side walls 3b are parallel with the mainstream direction. The side walls 3b are visible parts of the external walls 3a when viewed in the Z direction. Each of the side walls 3b may have a curved surface or an inclined surface suitable to the shape of the case 3. Each of the openings 12 may open in a direction perpendicular to the mainstream direction at various positions in a visible part of the external wall 3a, which is viewable in the Z direction.

One of the openings 12 opens in a side wall 3b of the case 3 on the one side in the Z direction. The other of the openings 12 opens in a side wall 3b of the case 3 on the other side in the Z direction. The mainstream flows along both the side walls 3b (refer to FIG. 4). According to the first embodiment, each of the side walls 3b has a wall along the mainstream direction. The wall has corresponding one of the openings 12 which opens therein. Thus, each of the openings opens in the direction perpendicular to the mainstream direction. According to the first embodiment, each of the openings 12 is formed in a rectangular shape. A stream, which flows out of each of the openings 12, merges with the mainstream.

The airflow sensor 4 outputs an electric signal, such as a voltage signal, based on an amount of air which flows in the bypass passage 8. Specifically, the airflow sensor 4 has a semiconductor substrate in which a membrane is formed. An exothermic element and a temperature sensing element are formed on the membrane. These elements are made from a thin film resistive element. The exothermic element and the temperature sensing element are connected to a circuit substrate being integrated in a circuit module. The airflow sensor 4 is contained in a portion of the circulating passage 14 in which air flows in an opposite direction to the flow direction of the intake passage 13. Therefore, the airflow sensor 4 attached to the circulating passage 14 detects the airflow amount.

(One Feature of First Embodiment)

Figure 2:
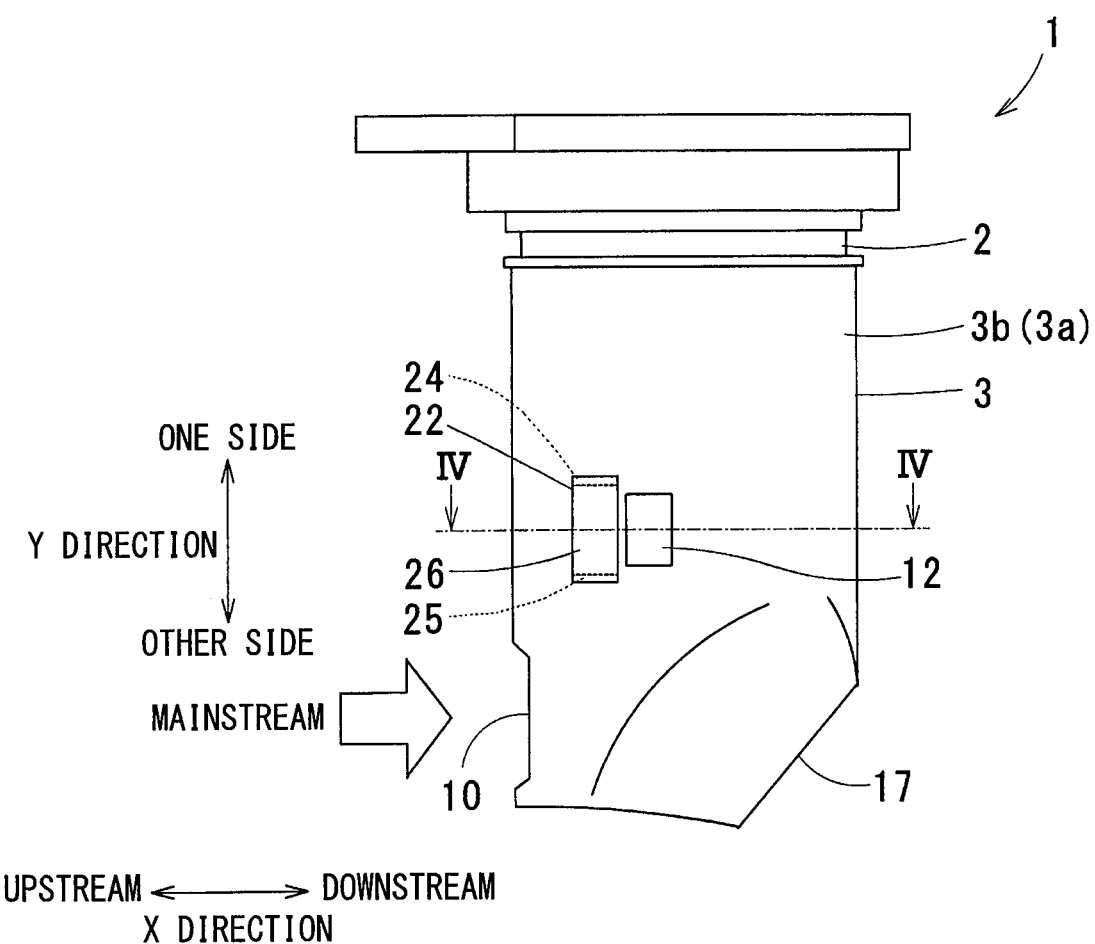
FIG. 2 is a plane view showing the airflow measuring device when viewed from the other side in the Z direction according to the first embodiment.
Figure 3:
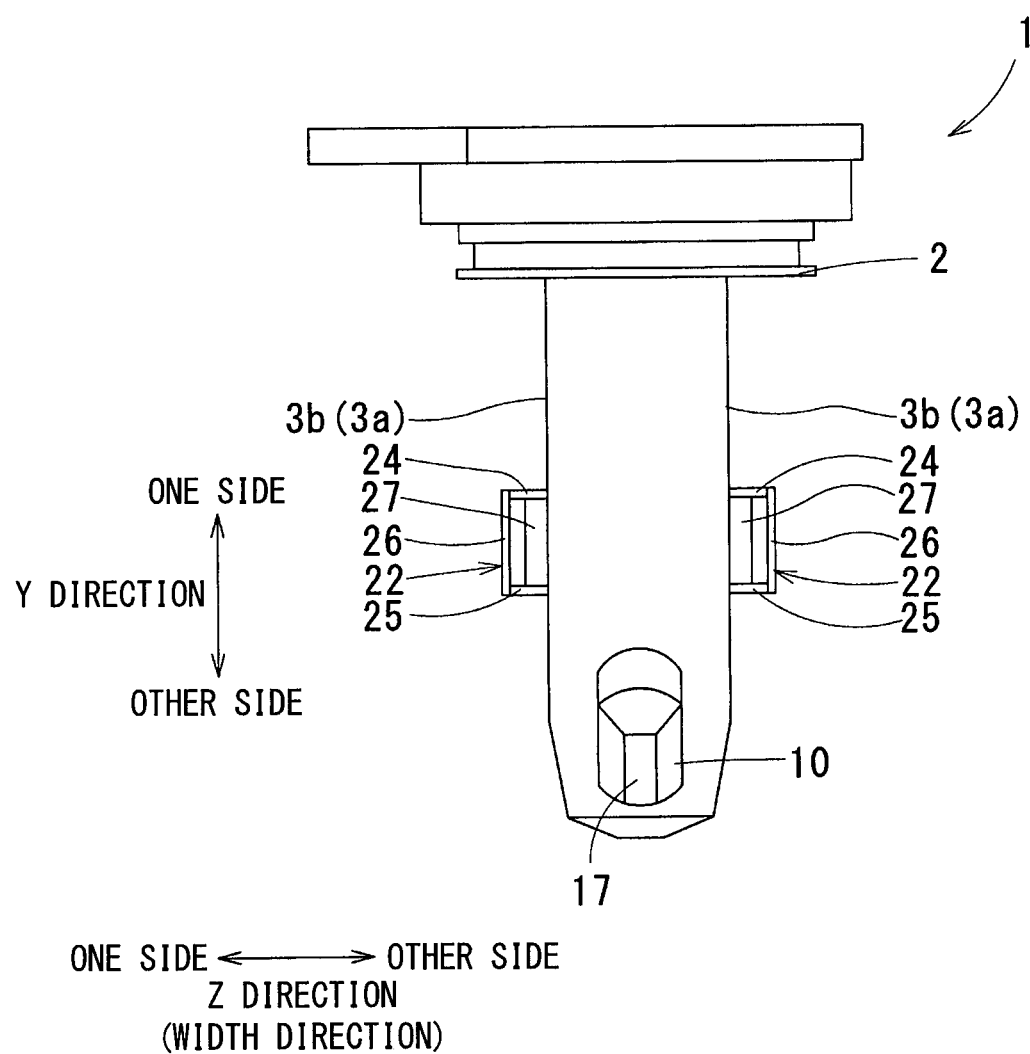
FIG. 3 is a plane view showing the airflow measuring device when viewed from an upstream side in the X direction according to the first embodiment.
Figure 4:
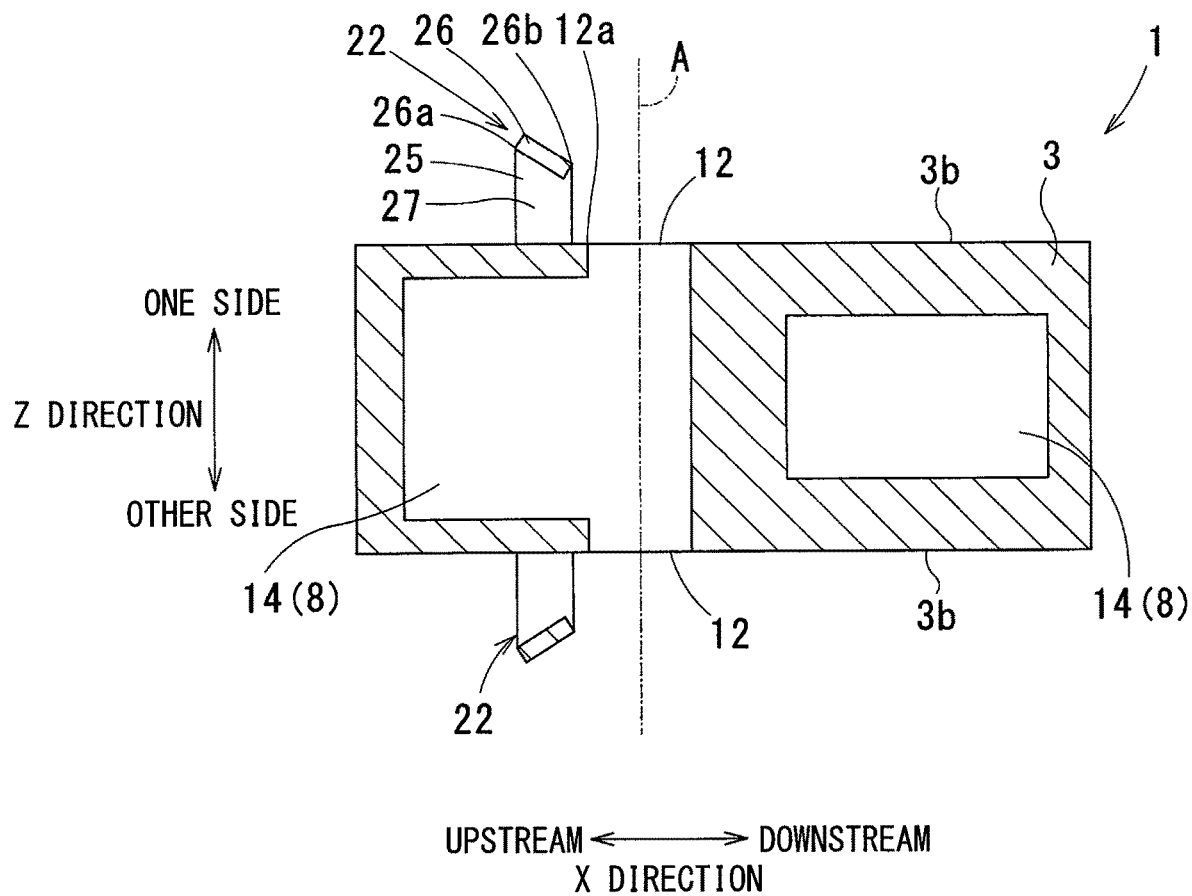
FIG. 4 is a sectional view taken along a line IV-IV in FIG. 2 according to the first embodiment.

Feature of the airflow measuring device 1 according to the first embodiment will be described with reference to FIGS. 2 to 4. FIG. 4 is a sectional view taken perpendicularly to the Y direction at a position where the pair of outlet ports 12 is located in the case 3.

The airflow measuring device 1 according to the first embodiment has a pair of throttles 22. Each of the throttles 22 is located on the upstream side in the mainstream direction than a center of the opening 12 to throttle a stream of air which flows outside the case 3 along the side wall 3b.

According to the first embodiment, each of the throttles 22 is provided on the upstream side in the mainstream direction than an upstream end 12a of the opening 12. FIG. 4 shows a virtual line A extending perpendicularly to the X direction to pass through the centers of the openings 12.

Each of the throttles 22 includes, for example, two projections 24, 25 and a lid body 26. The projections 24, 25 protrude from the sidewalls 3b. Each of the lid bodies 26 bridges the two projections 24, 25.

According to the first embodiment, the projections 24, 25 are formed in plate shapes, whose thickness direction is along the Y direction. The projections 24, 25 protrude in the Z direction and extend in parallel with the X direction (refer to FIG. 2, 3). The projections 24 are provided on the one side than the one end of the openings 12 relative to the Y direction. The projections 25 are provided on the other side than the other end of the openings 12 relative to the Y direction (refer to FIG. 2).

Each of the lid bodies 26 is formed in a plate shape. The lid body 26 is provided to bridge the two projections 24, 25. According to the first embodiment, the length of the lid body 26 is equal to the length of the projections 24, 25 in the mainstream direction. The two projections 24, 25 and the lid body 26 partition a region, which is a space partitioned by the two projections 24, 25, the lid body 26 and the side wall 3b. The space forms a passage 27 where a part of the mainstream flows by.

Each of the passages 27 has a passage sectional area reducing toward the downstream side. The passage 27 throttles the stream of air toward the downstream side. The throttled stream through the passage 27 merges with air flowing out from the openings 12.

According to the first embodiment, the distance between the lid body 26 and the side wall 3b in the Z direction becomes smaller toward the downstream. Thereby, the sectional size of the passage 27 becomes narrower toward the downstream side. In other words, the lid body 26 is inclined with respect to the side walls 3b. According to the first embodiment, both of the upstream end 26a and the downstream end 26b of the lid body 26 are located on the upstream side than the upstream end 12a of the opening 12.

(One Effect of First Embodiment)

The airflow measuring device 1 according to the first embodiment has the throttles 22 located on the upstream side in the mainstream direction than the centers of the openings 12 to throttle the streams of air which flow outside the case 3 along the side walls 3b. Thereby, parts of the mainstream pass around the outlet ports 12 of the bypass passage 12 faster. The parts of the mainstream influence air, which flows out from the outlet ports 12 of the bypass passage 12, to flow toward downstream smoothly to reduce peeling of the streams when the streams from the outlet ports 12 merge with the mainstream.

The throttles 22 accelerate the parts of the mainstream to be faster so that the pressure of the mainstream decreases around the outlet ports 12 to promote flowing out of air from the outlet ports 12. In other words, the venture effect works efficiency.

Figure 5:
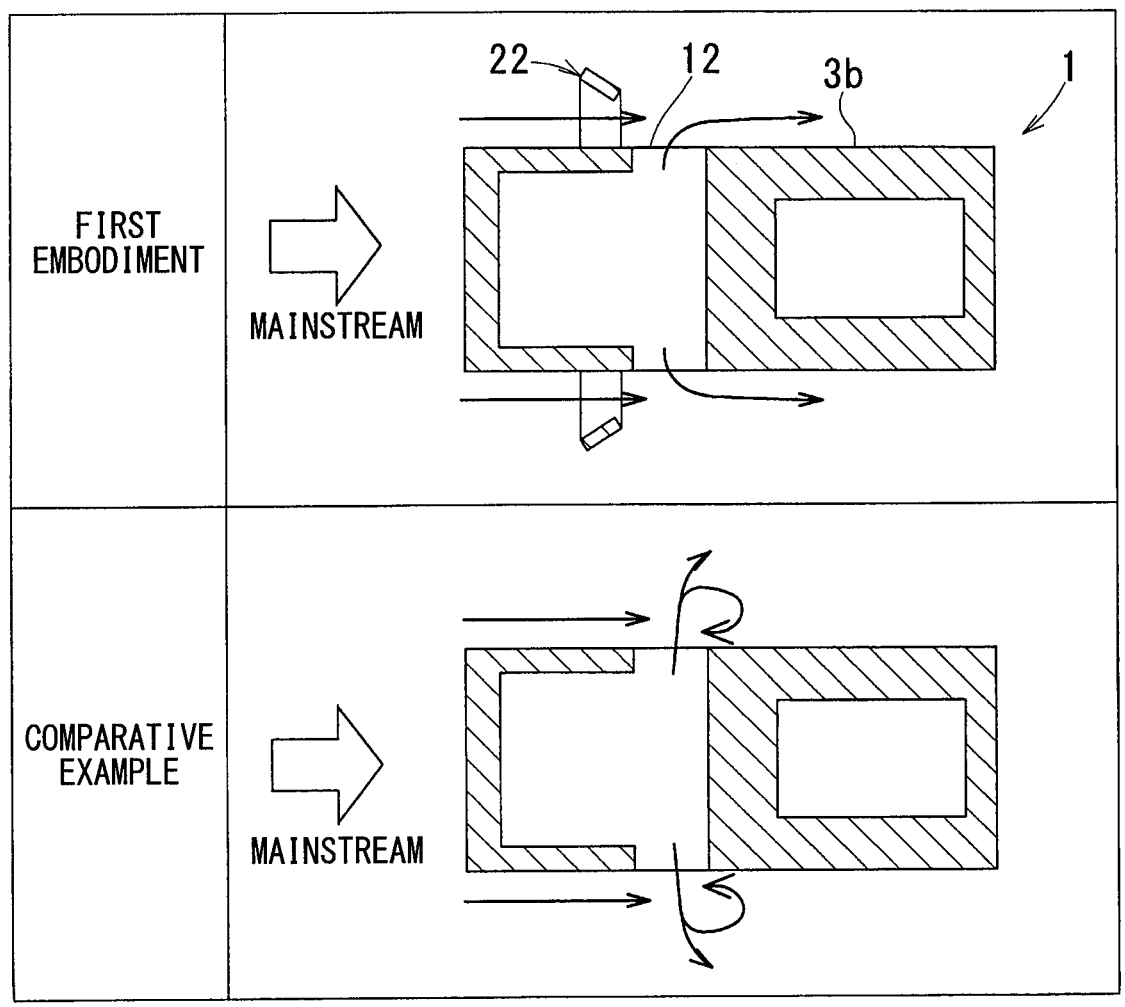
FIG. 5 is a view explaining an effect of the airflow measuring device according to the first embodiment.

FIG. 5 shows a comparative example which does not have any throttles 22. In the comparative example, it is difficult for the streams flowing out from the outlet ports 12 to flow along the side walls 3b when the streams from the outlet ports 12 merge with the mainstream. As a result, the streams flowing out from the outlet ports 12 flow perpendicularly to the mainstream to cause peering. When the peering occurs, vortexes happen around the outlet ports 12 and on the downstream side of the outlet ports 12 in the mainstream direction. The vortexes may adversely affect accuracy in measuring airflow. On the other hand, according to the first embodiment, the streams flowing out from the outlet ports 12 flow along the side walls 3b toward downstream with the accelerated mainstream. Thereby, the peeling is not easily generated.

Second Embodiment

Figure 6:
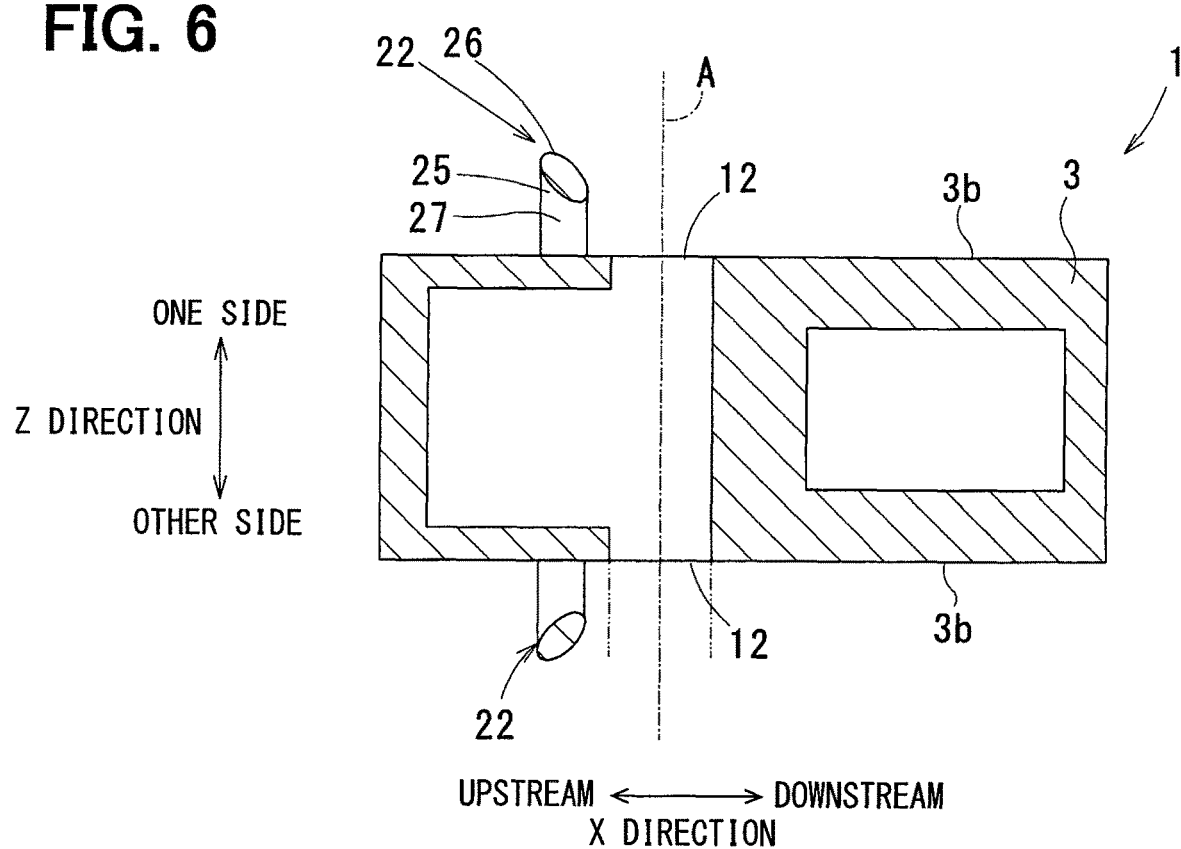
FIG. 6 is a sectional view showing a main part of an airflow measuring device according to the second embodiment.

Different aspect of the second embodiment from the first embodiment will be described mainly with reference to FIG. 6. According to the second embodiment, sectional shapes of the lid bodies 26 perpendicular to the Y direction are in streamline shapes. Thereby, passage resistance of the passages 27 is smaller in order to accelerate the streams of the passages 27 further. As a result, the effect of peeling reduction is improved.

Third Embodiment

Figure 7:
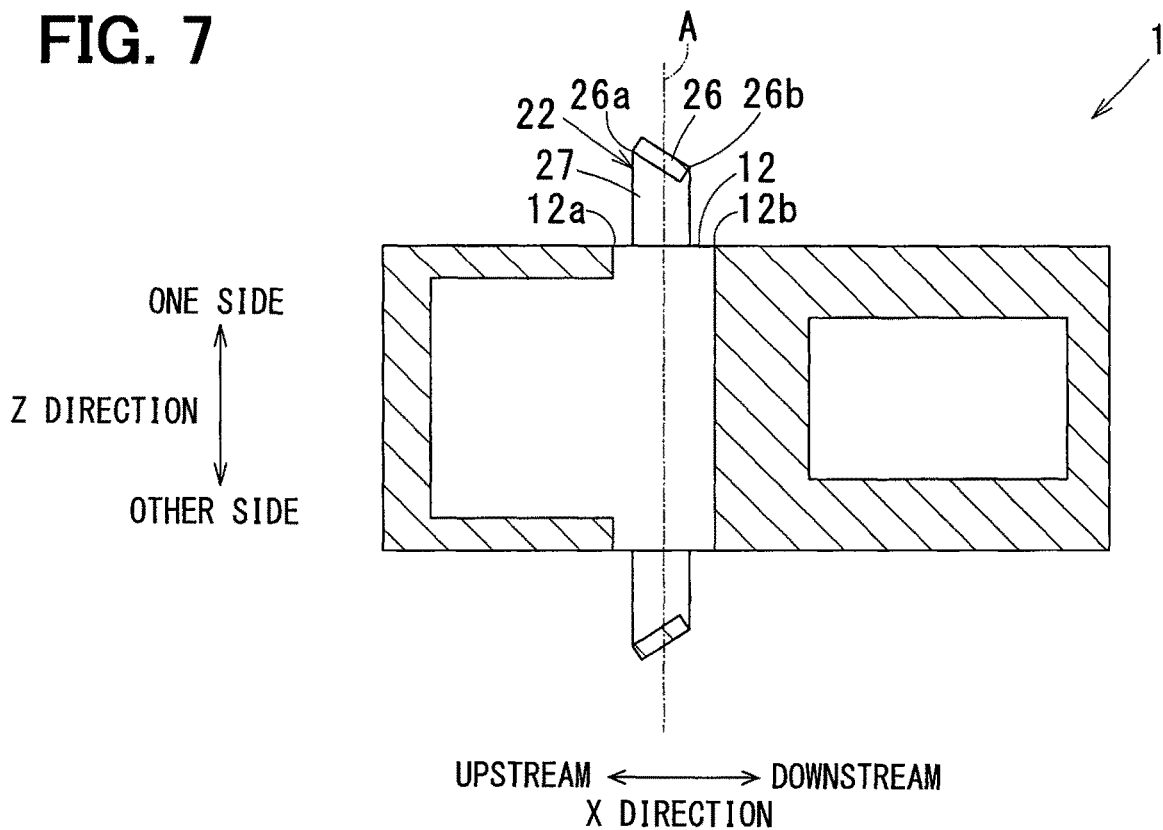
FIG. 7 is a sectional view showing a main part of an airflow measuring device according to the third embodiment.

Different aspect of the third embodiment from the first embodiment will be described mainly with reference to FIG. 7. According to the first embodiment, the downstream ends 26b of the lid bodies 26 are located on the upstream side than the upstream ends 12a of the openings 12. On the other hands, according to the third embodiment, the upstream ends 26a of the lid bodies 26 are located between the virtual line A and the upstream ends 12a of the openings 12 relative to the mainstream direction. In addition, the downstream ends 26b of the lid bodies 26 are located between the virtual line A and the downstream ends 12b of the openings 12 relative to the mainstream direction. Thereby, the effect is provided as well as the first embodiment.

Fourth Embodiment

Figure 8:
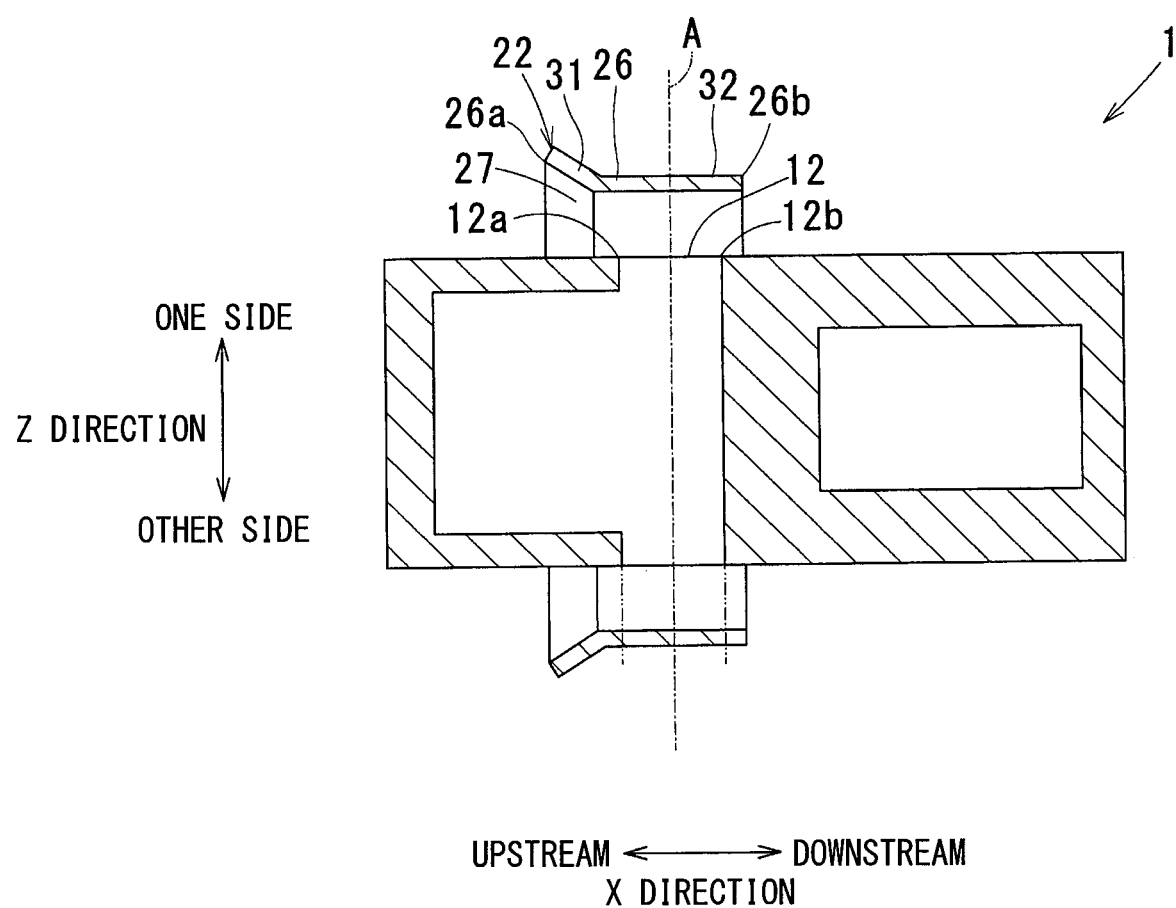
FIG. 8 is a sectional view showing a main part of an airflow measuring device according to the fourth embodiment.

Different aspect of the fourth embodiment from the first embodiment will be described mainly with reference to FIG. 8. According to the first embodiment, the downstream ends 26b of the lid bodies 26 are located on the upstream side than the upstream ends 12a of the openings 12. On the other hands, according to the fourth embodiment, the downstream ends 26b of the lid bodies 26 are located on the downstream side than the downstream ends 12b of the openings 12.

Each of the lid bodies 26 has an inclined part 31 and a parallel part 32. The inclined part 31 is inclined with respect to the side wall 3b. The parallel part 32, which is connected to the downstream end of the inclined part 31, is parallel with the side wall 3b. A boundary part between the inclined part 31 and the parallel part 32 is located on the upstream part 31 than the upstream end 12a of the opening 12. Thereby, the effect is provided as well as the first embodiment. In addition, the lid body 26 extends toward the downstream so that the merged air flows along the side walls 3b easily.

Alternative Embodiment

Figure 9:
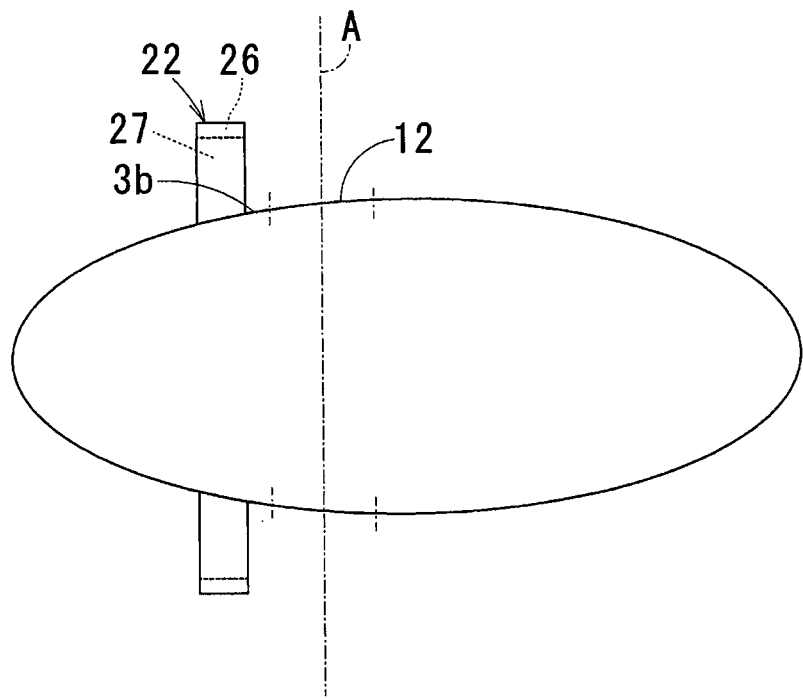
FIG. 9 is a plane view showing an airflow measuring device when viewed in the Y direction according to the first alternative embodiment.
Figure 10:
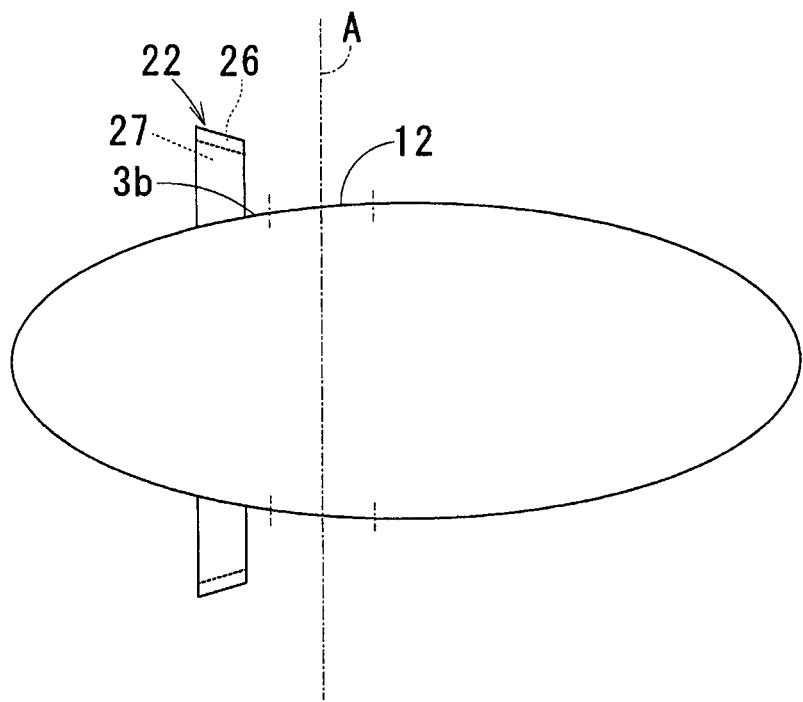
FIG. 10 is a plane view showing an airflow measuring device when viewed in the Y direction according to the second alternative embodiment.

It is noted that, according to the first embodiment, the case 3 has the substantially rectangular shape when viewed in the Y direction. It is further noted that, the case may have an elliptic shape as shown in FIGS. 9 and 10. In the structure, as shown in FIG. 9, the side walls 3b are inclined. Consequently, even in a structure where the lid bodies 26 are parallel with the X direction (refer to FIG. 4), the passages 27 throttle airflows toward the downstream. It is further noted that, as shown in FIG. 10, the lid bodies 26 may be inclined as well as the first embodiment.

In the above examples, the distance between the lid body 26 and the side wall 3b becomes smaller toward the downstream in order to throttle the passage 27. It is further noted that, the distance between the projection 24 and the projection 25 may become smaller toward the downstream in order to throttle the passage 27. In addition, both of the distance, between the lid body 26 and the side wall 3b, and the distance between the projection 24 and the projection 25 may become smaller toward the downstream in order to throttle the passages 27.

In the above examples, the length of the lid body 26 is equal to the length of the projections 24, 25 in the mainstream direction. It is further noted that, the length of the lid body 26 may be larger than the length of the projections 24, 25 in the mainstream direction or may be smaller than the length of the projections 24, 25 in the mainstream direction.

In the above examples, the inner passage 11 having the circulating passage 14 provides the bypass passage 8. The bypass passage 8, however, is not limited to such a structure. It is further noted that, the bypass passage 8 may be formed along the mainstream direction in such a way as to flow air, drawn from the inlet port 10, along the mainstream direction therein and to flow out the air from the outlet ports 12.

According to the present disclosure, the airflow measuring device is equipped to the air intake passage where the mainstream of air flows to be drawn into the engine. The airflow measuring device includes the case and the sensor. The case has the bypass passage which draws a part of the mainstream. The sensor is equipped to the bypass passage.

The mainstream flows in the mainstream direction. The case has the external wall as the side wall extending along the mainstream direction. The bypass passage has the outlet port, which is formed in the side wall, as the opening in such a way as to open in the direction substantially perpendicular to the mainstream direction.

The airflow measuring device further includes the throttle located on the upstream side in the mainstream direction than the center of the opening to throttle a stream of air which flows outside the case along the side wall. The throttle throttles the stream of air to flow toward the downstream side and to merge with air flowing out from the opening.

With the present configuration, a part of the mainstream passes around the outlet port of the bypass passage faster. The part of mainstream influences air to flow out from the outlet port of the bypass passage toward downstream smoothly to reduce peeling of the stream when the stream from the outlet port merges with the mainstream.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device comprising:
   a case inserted in an intake passage where a mainstream of air flows along a mainstream direction toward an engine, the case having a dust discharging passage and a bypass passage therein, wherein the dust discharging passage draws a part of the mainstream of air, and the bypass passage is divided from the dust discharging passage;
   a sensor equipped to the bypass passage, wherein the case has an external wall as a side wall extending along the mainstream direction, wherein the bypass passage has an outlet port formed in the side wall, the outlet port being formed such that an opening of the outlet port faces in a direction substantially perpendicular to the mainstream direction; and
   a throttle that is formed separately from the dust discharging passage, is located outside of the side wall of the case, and throttles a stream of air, which flows outside the case along the side wall, to flow downstream along the mainstream direction and to merge with air flowing out from the opening of the outlet port, wherein
   the opening of the outlet port has:
      a center along the mainstream direction; and
      a downstream end located most downstream in the opening along the mainstream direction,
   the throttle is located upstream of the center along the mainstream direction,
   the throttle has:
      a downstream end located most downstream in the throttle along the mainstream direction; and
      an upstream end located most upstream in the throttle along the mainstream direction,
   the downstream end of the throttle is located upstream of the downstream end of the opening along the mainstream direction, and
   a width of the upstream end of the throttle is larger than a width of the downstream end of the throttle in a cross section perpendicular to an insertion direction along which the case is inserted in the intake passage.

2. The airflow measuring device according to claim 1, wherein
   the throttle is formed with two projections, which project from the side wall, and a lid body, the lid body bridging the two projections, and
   the two projections and the lid body partition a region to throttle the stream of air toward a downstream side along the mainstream direction.

3. The airflow measuring device according to claim 1, wherein
   the case causes air to flow through the dust discharging passage, the bypass passage, and the opening in this order, and
   the opening directs air from the bypass passage to flow in a direction perpendicular to both the mainstream direction and the insertion direction.

4. The airflow measuring device according to claim 1, wherein
   the opening has an upstream end located most upstream in the opening along the mainstream direction, and
   the upstream end of the throttle is located upstream of the upstream end of the opening along the mainstream direction.

5. The airflow measuring device according to claim 4, wherein
   the downstream end of the throttle is located upstream of the upstream end of the opening along the mainstream direction.

6. The airflow measuring device according to claim 1, wherein
   the throttle is located on an outside of the opening in a direction perpendicular to both the mainstream direction and the insertion direction.

7. The airflow measuring device according to claim 6, wherein
   the throttle is formed with two projections, which project from the side wall, and a lid body, the lid body bridging the two projections, and
   the lid body covers entirety of the opening on an outside of the opening in the direction perpendicular to both the mainstream direction and the insertion direction.

8. The airflow measuring device according to claim 1, wherein
   the opening has an upstream end located most upstream in the opening along the mainstream direction, and
   the downstream end of the throttle is located between the downstream end of the opening and the upstream end of the opening along the mainstream direction.

9. The airflow measuring device according to claim 1, wherein
   the downstream end of the throttle is located between the downstream end of the opening and the center of the opening along the mainstream direction.

10. An airflow measuring device comprising:
    a case inserted in an intake passage where a mainstream of air flows along a mainstream direction toward an engine, the case having a dust discharging passage and a bypass passage therein, wherein the dust discharging passage draws a part of the mainstream of air, and the bypass passage is divided from the dust discharging passage;

a sensor equipped to the bypass passage, wherein the case has an external wall as a side wall extending along the mainstream direction, wherein the bypass passage has an outlet port formed in the side wall, the outlet port being formed such that an opening of the outlet port faces in a first direction substantially perpendicular to both the mainstream direction and an insertion direction along which the case is inserted in the intake passage; and a throttle that is formed separately from the dust discharging passage, is located outside of the side wall of the case, and throttles a stream of air, which flows outside the case along the side wall, to flow downstream along the mainstream direction and to merge with air flowing out from the opening of the outlet port, wherein the opening of the outlet port has:
- a center along the mainstream direction; and
- a downstream end located most downstream in the opening along the mainstream direction, the throttle is located upstream of the center along the mainstream direction, the throttle has:
- a downstream end located most downstream in the throttle along the mainstream direction; and
- an upstream end located most upstream in the throttle along the mainstream direction, the downstream end of the throttle is located upstream of the downstream end of the opening along the mainstream direction, and a width of the upstream end of the throttle is larger than a width of the downstream end of the throttle in a cross section perpendicular to the insertion direction.

11. The airflow measuring device according to claim 10, wherein
the outlet port extends through the side wall, and
the throttle is located outside the side wall of the case.

12. The airflow measuring device according to claim 10, wherein
the opening has an upstream end located most upstream in the opening along the mainstream direction, and
the downstream end of the throttle is located between the downstream end of the opening and the upstream end of the opening along the mainstream direction.

13. The airflow measuring device according to claim 10, wherein
the downstream end of the throttle is located between the downstream end of the opening and the center of the opening along the mainstream direction.

14. An airflow measuring device comprising:
a case inserted in an intake passage where a mainstream of air flows along a mainstream direction toward an engine, the case having a dust discharging passage and a bypass passage therein, wherein the dust discharging passage draws a part of the mainstream of air, and the bypass passage is divided from the dust discharging passage;

a sensor equipped to the bypass passage, wherein the case has an external wall as a side wall extending along the mainstream direction, wherein the bypass passage has an outlet port formed in the side wall, the outlet port being formed such that an opening of the outlet port faces in a first direction substantially perpendicular to both the mainstream direction and a second direction in which the case protrudes; and a throttle that is located outside of the side wall of the case and throttles a stream of air, which flows outside the case along the side wall, to flow downstream along the mainstream direction and to merge with air flowing out from the opening of the outlet port, wherein the opening of the outlet port has:
- a center along the mainstream direction; and
- a downstream end located most downstream in the opening along the mainstream direction, the throttle is located upstream of the center along the mainstream direction, the throttle has:
- two projections projecting from the side wall;
- a lid body bridging the two projections;
- a downstream end located most downstream in the throttle along the mainstream direction; and
- an upstream end located most upstream in the throttle along the mainstream direction, the downstream end of the throttle is located upstream of the downstream end of the opening along the mainstream direction, the two projections and the lid body partition a region to throttle the stream of air toward a downstream side along the mainstream direction, and a width of the upstream end of the throttle is larger than a width of the downstream end of the throttle in a cross section perpendicular to the insertion direction.

15. The airflow measuring device according to claim 14, wherein
the outlet port extends through the side wall, and
the throttle is located outside the side wall of the case.

16. The airflow measuring device according to claim 14, wherein
the opening has an upstream end located most upstream in the opening along the mainstream direction, and
the downstream end of the throttle is located between the downstream end of the opening and the upstream end of the opening along the mainstream direction.

17. The airflow measuring device according to claim 14, wherein
the downstream end of the throttle is located between the downstream end of the opening and the center of the opening along the mainstream direction.

* * * * *